(12) United States Patent
Breuing

(10) Patent No.: US 9,610,961 B2
(45) Date of Patent: Apr. 4, 2017

(54) METHOD AND DEVICE FOR MEASURING SPEED IN A VEHICLE INDEPENDENTLY OF THE WHEELS

(71) Applicant: Robert Bosch GmbH, Stuttgart (DE)

(72) Inventor: Holger Breuing, Ilsfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/369,512

(22) PCT Filed: Nov. 6, 2012

(86) PCT No.: PCT/EP2012/071920
§ 371 (c)(1),
(2) Date: Jun. 27, 2014

(87) PCT Pub. No.: WO2013/102507
PCT Pub. Date: Jul. 11, 2013

(65) Prior Publication Data
US 2015/0005993 A1  Jan. 1, 2015

(30) Foreign Application Priority Data
Jan. 5, 2012 (DE) .......... 10 2012 200 139

(51) Int. Cl.
*G01P 3/00* (2006.01)
*G01S 17/58* (2006.01)
(Continued)

(52) U.S. Cl.
CPC .......... *B61L 99/00* (2013.01); *B61L 15/0063* (2013.01); *B61L 23/041* (2013.01); *B61L 25/021* (2013.01); *B61L 25/025* (2013.01); *B61L 25/026* (2013.01); *G01P 3/00* (2013.01); *G01S 7/4056* (2013.01); *G01S 13/60* (2013.01); *G01S 15/60* (2013.01); *G01S 17/58* (2013.01); *B61L 2205/04* (2013.01); *G01S 2007/4082* (2013.01)

(58) Field of Classification Search
CPC .......... G01S 13/60; G01S 15/60; G01S 17/58
See application file for complete search history.

(56) References Cited

U.S. PATENT DOCUMENTS 5,371,718 A * 12/1994 Ikeda ................ B60T 8/172
342/104
6,300,896 B1  10/2001 Kull et al.
(Continued)

FOREIGN PATENT DOCUMENTS

CN   101738601 A  *  6/2010
EP    1 014 108       6/2000
(Continued)

OTHER PUBLICATIONS

International Search Report, PCT International Application No. PCT/EP2012/071920, dated Feb. 4, 2013.

*Primary Examiner* — Dale Moyer
(74) *Attorney, Agent, or Firm* — Gerard Messina

(57) ABSTRACT

A method for determining the speed of a vehicle is described. In this method, at least one object present in the environment of the vehicle is detected and a relative speed of the detected object in relation to the vehicle is measured. In addition, the speed of the vehicle is determined on the basis of the relative speed of the object.

10 Claims, 4 Drawing Sheets

(51) Int. Cl.

| | | |
|---|---|---|
| *B61L 99/00* | (2006.01) | |
| *G01S 13/60* | (2006.01) | |
| *G01S 15/60* | (2006.01) | |
| *G01S 7/40* | (2006.01) | |
| *B61L 15/00* | (2006.01) | |
| *B61L 23/04* | (2006.01) | |
| *B61L 25/02* | (2006.01) | |
| *G01P 3/38* | (2006.01) | |

(56) References Cited

U.S. PATENT DOCUMENTS

| | | | | |
|---|---|---|---|---|
| 2001/0027371 | A1* | 10/2001 | Winner | B60K 31/0008 |
| | | | | 701/96 |
| 2005/0228580 | A1* | 10/2005 | Winner et al. | 701/200 |
| 2006/0001566 | A1* | 1/2006 | Maass | 342/70 |
| 2010/0017128 | A1* | 1/2010 | Zeng | 701/301 |
| 2013/0268172 | A1* | 10/2013 | Nandedkar | G06F 17/00 |
| | | | | 701/70 |

FOREIGN PATENT DOCUMENTS

| | | | | |
|---|---|---|---|---|
| JP | 11227607 | A | * | 8/1999 |
| JP | 2000177515 | A | | 6/2000 |
| JP | 2003043139 | A | | 2/2003 |
| WO | 2007015288 | A1 | | 2/2007 |

* cited by examiner

METHOD AND DEVICE FOR MEASURING SPEED IN A VEHICLE INDEPENDENTLY OF THE WHEELS

FIELD

The present method relates to a method for determining the speed of a vehicle, in particular a rail-bound vehicle. In addition, the present invention relates to a corresponding device for determining the speed of the vehicle.

BACKGROUND INFORMATION

Among other devices, sensors which ascertain the rotational wheel speed are used to measure the speed of a rail-bound vehicle. However, under certain operating conditions such as in uphill driving, in acceleration or braking operations or under certain weather conditions, this measuring method may turn out to be unreliable for ascertaining the driving speed or the absolute speed of the rail-bound vehicle. This is why modern rail-bound vehicles also utilize sensors that use the reflection of optical beams or acoustic signals at the undersurface for determining the absolute speed of the vehicle. In this measuring method as well, the reliability may be subject to considerable fluctuations due to external influences such as soiling of the sensors or weather-related reduced reflectivity of the undersurface.

SUMMARY

It is an object of the present invention to provide an alternative or supplementary measuring method for determining the absolute speed of a rail-bound vehicle. Further advantageous specific embodiments of the present invention are described below and shown in the figures.

The present invention provides a method for determining the absolute speed of a rail-bound vehicle, in which at least one object situated in the environment of the rail-bound vehicle is detected and a relative speed of the detected object in relation to the rail-bound vehicle is measured. In so doing, the absolute speed of the rail-bound vehicle is determined based on the relative speed of the object. When the relative movement of objects in the vicinity of the vehicle is utilized, it is possible to perform a speed measurement that is independent of the condition of the subsurface and the weather conditions.

In one specific embodiment, it is analyzed whether the detected object is a stationary or moving object. The relative speed of the detected object is used for ascertaining the absolute speed of the vehicle only if the particular object was deemed to be stationary. The restriction to stationary objects makes it possible to increase the accuracy of the speed determination.

In one further specific embodiment, the relative speed of the detected object is compared with a reference speed. The particular relative speed will then be used to evaluate the absolute speed of the vehicle only if it generally corresponds to the reference speed. The comparison with a reference speed allows a very simple analysis of the measured relative speeds of different objects, which simplifies the detection of stationary or suitable objects.

In another specific embodiment, the absolute speed of the vehicle is ascertained in recurring manner, and the most recently determined value of the absolute speed of the vehicle is used as reference speed in each case. Especially in situations in which the current absolute speed of the vehicle differs only slightly from the most recently ascertained absolute speed, the precision in the detection of suitable or stationary objects is able to be improved in this way.

In one further specific embodiment, the relative speeds of multiple objects detected in the vehicle vicinity are measured and the reference speed is determined on the basis of an average value ascertained from the relative speeds of the detected objects. Deviations in the relative speeds of individual objects are able to be reduced in a relatively simple manner by forming an average value. Especially in situations in which a low number of unsuitable or moving objects is opposed by a large number of suitable or stationary objects, the average value supplies a sufficiently accurate reference value for evaluating the detected objects.

In another specific embodiment, the relative speeds of multiple objects detected in the vicinity of the vehicle are measured, and an individual probability that a stationary object is involved is determined for each detected object. Furthermore, only objects having the highest probability are taken into account when determining the absolute speed of the vehicle. The assignment of an individual probability to each object allows a simple classification or rating of the detected objects. In addition, the selection of suitable objects is simplified in that from a multiplicity of potentially suitable objects, only the objects having the highest probability are considered.

In another specific embodiment, the probability that is assigned to an object that it is a stationary object increases with increasing agreement between the relative speed determined for this object and the reference speed. In principle, any object may be assigned a separate probability that it is a stationary object, based on different criteria, including also the form or the position of the detected object. However, an especially uncomplicated evaluation results from the correlation of the probability assigned to an object, and the match between the relative speed of the particular object and the reference speed.

In addition, in a further specific embodiment, the reference speed is ascertained based on a speed of the vehicle determined with the aid of a reference sensor. To determine the reference speed, for instance, the reference sensor uses the reflection of optical beams at the subsurface, the reflection of sonic waves at the subsurface, the wheel speed, and/or satellite-based navigation. The use of an additional sensor to ascertain the reference speed provides an especially current reference value when analyzing the detected objects. Moreover, the computing power required to determine the reference value is able to be reduced because it is generally not necessary to use complex evaluation algorithms.

One further specific embodiment provides that the driving speed of the vehicle is ascertained based on the measured relative speed of objects that are situated in front of and/or behind the vehicle in the driving direction. Using the driving direction of objects situated in front of the vehicle in the driving direction makes it possible to utilize already existing sensors or sensor systems, especially driver assistance systems, which reduces the number of devices of the measuring system. The orientation of the measurement toward objects behind the vehicle allows the detection even of objects that supply no adequate sensor signal in a frontal measurement, e.g., hidden objects or objects that are not fully detectable due to snow and sand drifts. In contrast, the simultaneous detection of objects in front of and behind the vehicle provides a higher number of suitable measurements and thus in principle also an improvement in the accuracy of the vehicle speed determination.

The present invention is explained in greater detail below with reference to the figures.

DETAILED DESCRIPTION OF EXAMPLE EMBODIMENTS

Figure 1:
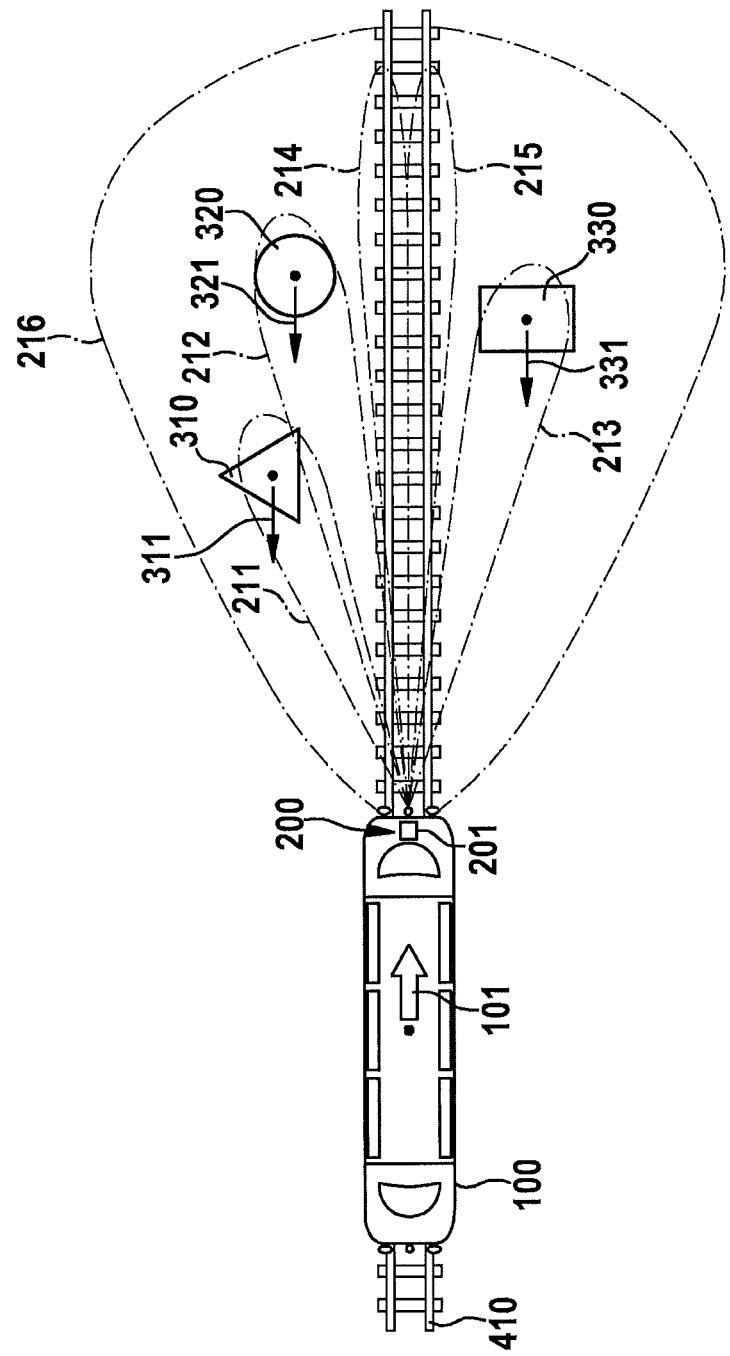
FIG. 1 shows in schematic form, a driving situation, in which a moving rail-bound vehicle equipped with an example measuring device according to the present invention detects multiple stationary objects situated in front of the rail-bound vehicle.

To determine the driving speed of a vehicle, the relative speed of objects in the environment of the vehicle is measured with the aid of one or multiple sensor(s) in the concept according to the present invention. The own speed is then ascertained in the vehicle using a plausibility check, via the relative speed in relation to the detected objects, in particular in relation to the stationary objects.

Sensors within the meaning of the present invention are basically any suitable measuring devices, sensor devices and detection devices that record the environment of the vehicle in optical, acoustical or electromagnetic manner. Especially measuring methods that allow the detection of the objects and the measuring of the relative speed of the detected objects in one step are able to be used for this purpose. As an alternative, it is also possible to employ other methods for detecting the objects and for measuring their relative speed. In the first case, for instance, radar may be used to measure both the position of an object and its relative speed in relation to the vehicle. A frequency-modulated radar, such as FMCW radar (frequency-modulated continuous wave), for example, is suitable in this context. The modulation of the radar signal allows a measurement of the propagation time by temporally correlating the emitted signal with the signal reflected at the object and received in the device, i.e., an absolute distance measurement of the particular object. Apart from measuring the radial distance of the object to the vehicle in order to determine the precise position of an object in a world coordinate system, directional information (azimuth angle) of the particular object in relation to the driving direction is usually measured as well. In scanning radar systems, this solid angle results automatically from the current orientation of the receive antenna. On the other hand, in a radar system having static antennas, the directional information is determined by the distribution of the intensities of the signals received by the different antennas.

In contrast to modulated radar signals, when using an unmodulated radar signal while utilizing the Doppler effect, it is not readily possible to measure the position of an object in addition to the radial speed. The distance measurement required to determine the precise position of the object is basically impossible in this Doppler radar, due to the missing time basis in the radar signal.

In addition to the simultaneous measurements of the distance or position and the speed of an object relative to the vehicle with the aid of a single modulated radar, it is furthermore possible to carry out the position and speed measurement of an object with the aid of multiple sensor or measuring devices. For instance, an optical measuring device which includes two or more video cameras, makes it possible to determine the relative position of an object in fairly simple manner. The relative speed of the detected object, on the other hand, is able to be measured with the aid of a further measuring device, such as a Doppler radar or an acoustic Doppler measuring device.

The use of a stereoscopically operating optical measuring device, however, makes it possible to record the positional change of the object over time as well, and thus its relative speed.

As a result, the determination of the relative speed of an object in relation to the vehicle may basically be carried out in different ways, depending on the measuring method. In measuring methods that measure the absolute or relative position of an object, the relative speed of the particular object is able to be determined on the basis of the positional change that is undergone by the involved object relative to vehicle 100 within a predefined time. On the other hand, in a measuring method that measures the radial speed of the particular object relative to the vehicle, the relative speed of an object is calculated by geometrical conversion of the measured radial speed utilizing the measured solid angle.

The present invention is explained below based on a typical driving situation, in which multiple objects situated, or encountered while driving, in front of the vehicle in the driving direction are recorded simultaneously or one after the other at brief intervals. In this context, FIG. 1 shows a vehicle 100 equipped with measuring device 200 according to the invention for determining the driving speed, which in this example is developed as a rail-bound vehicle moving along rails 410. As indicated by thick arrow 101, vehicle 100 is moving from left to right. Three different objects 310, 320, 330 are situated in front of the vehicle in the driving direction. These are stationary objects; stationary objects could be any suitable object whose geographical position does not change within the time period that is relevant for the measurement. For example, trees, signal signs, distributor boxes, buildings, other structures or stationary vehicles are among such objects.

To measure the relative speed of objects 310, 320, 330, vehicle 100 is equipped with a measuring device 200 according to the present invention, which in this case includes a sensor system 201 situated in the front region of vehicle 100. Sensor system 201 is set up to detect objects that appear in front of vehicle 100 and to measure their speed relative to vehicle 100. For this purpose sensor system 201 has at least one sensor 210, whose measuring cone detects objects in front of vehicle 100.

As shown in FIG. 1, objects 310, 320, 330 appearing in front of the vehicle are detected by at least one measuring cone of a measuring or sensor device 210 of sensor system 201 disposed in the front region of vehicle 100. Each detection cone 211, 212, 213, 214, 215, 216, shown in the form of a club by way of example, corresponds to a spatial measuring or detection range of a sensor device 210 of sensor system 201. Depending on the application, sensor system 201 may include multiple sensor devices whose detection cones are disposed at different angles or which are able to detect multiple objects simultaneously in azimuthally pivotable manner. As an alternative, however, it is also possible to monitor the region in front of vehicle 100 using a scanning sensor device, for which a predefined solid angle is periodically scanned by the measuring or detection cones of the scanning sensor device. In this case, the individual objects 310, 320, 330 are detected one after the other. A scanning radar or a laser scanner, for example, may be used for such a purpose.

As indicated with the aid of wide detection cone 216, it is furthermore also possible to use measuring or sensor devices that detect the entire pertinent region in front of the vehicle simultaneously. This may be done optically, for example, with the aid of one or multiple video camera(s). A rigid radar system or an acoustic Doppler measuring device having a correspondingly wide detection angle may basically be considered as well for this purpose.

Figure 2:
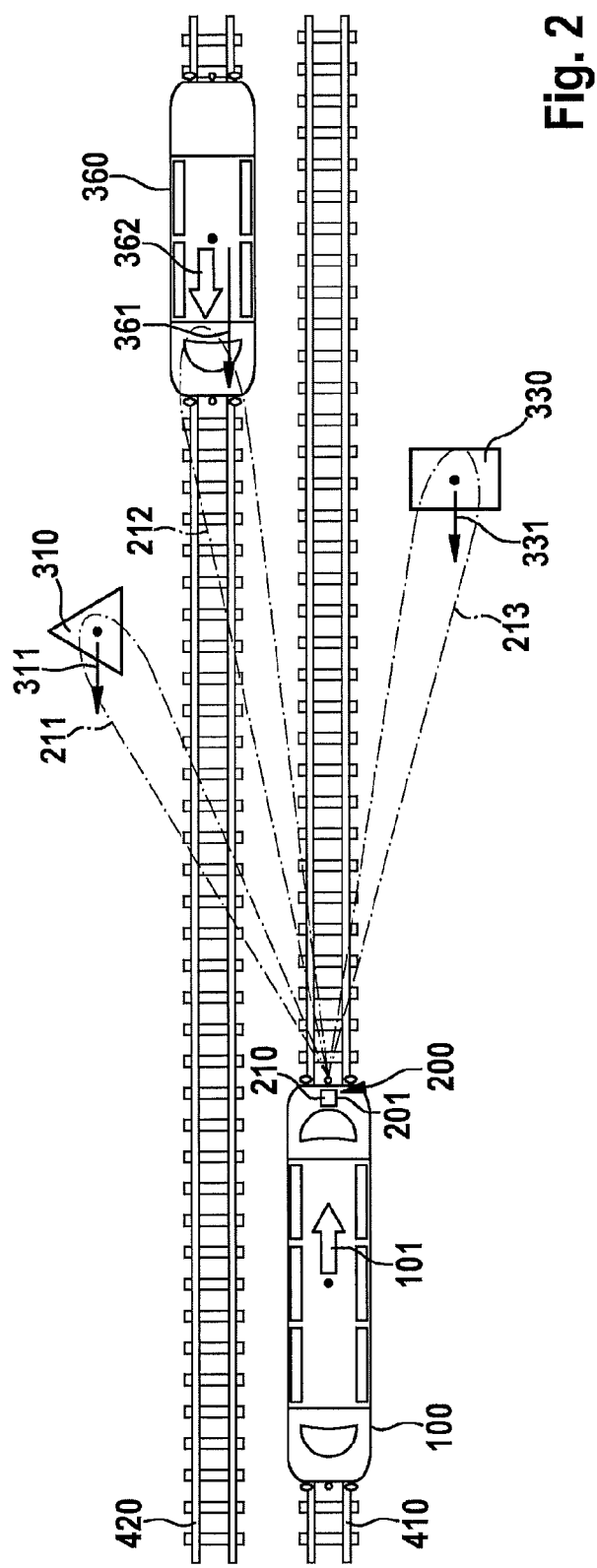
FIG. 2 shows in schematic form, a further driving situation, in which a moving rail-bound vehicle equipped with an example measuring device according to the present invention detects two stationary objects and one moving object.

FIG. 2 shows another driving situation of vehicle 100 equipped with measuring device 200 according to the present invention. In this case, one or multiple sensor(s) of frontal sensor system 201 detect(s) not only two stationary objects 310, 320, but also a non-stationary object 360. Non-stationary object 360 is a second rail-bound vehicle that is approaching vehicle 100 from the opposite direction on an adjacent rail track 420. The egomotion of second rail-bound vehicle 360 is indicated by thick arrow 362, the orientation and length of arrow 362 corresponding to the direction and speed of vehicle 360. Analogous to FIG. 1, the relative speeds of both stationary objects 310, 330 and non-stationary object 360, determined by means of sensor system 201, each have been illustrated by a thin arrow 311, 331, 361, respectively. While relative speeds 311, 331 of the two stationary objects 310, 330 generally correspond to current driving speed 101 of vehicle 100, a considerably higher relative speed 362 is measured for second rail-bound vehicle 360 due to its egomotion 361. The control and evaluation unit of measuring device 200 thus evaluates rail-bound vehicle 360 as a non-stationary or moving object because of its high relative speed, and thus as an unsuitable object. As a result, the particular relative speed will not be utilized for determining the driving speed of vehicle 100. In contrast, the two stationary objects 310, 330 are evaluated as stationary due to their relative speeds. The control and evaluation unit consequently uses the measured relative speeds of the two stationary objects 310, 330 to determine the current vehicle speed of vehicle 100.

The evaluation as stationary object or as non-stationary or moving object preferably is made by comparing the measured relative speed of an object with a suitable reference value. Suitable as reference value, for example, is the most recently determined value of the driving speed of vehicle 100. This is advantageous in particular when the time period since the last determination of the driving speed is so short that only a slight change in the driving speed may have occurred since then as a result of an acceleration or braking operation. If enough objects are available for a measurement, simultaneously or one after the other at short time intervals, then it is also possible to use the average value of the measured relative speeds of the particular objects as reference value. As an alternative or in addition, the reference value may also be ascertained with the aid of another method that is suitable for a speed measurement, in which case any suitable speed signal having sufficient accuracy (e.g., 10%) may be used as reference. For instance, it is possible to determine the reference speed with the aid of a sensor which measures the rotational speed of the wheels. A sensor that utilizes the reflection at the subsurface for determining the driving speed is able to supply a suitable relative speed. Finally, the reference speed may be obtained with the aid of a satellite-based sensor device (e.g., GPS).

Figure 3:
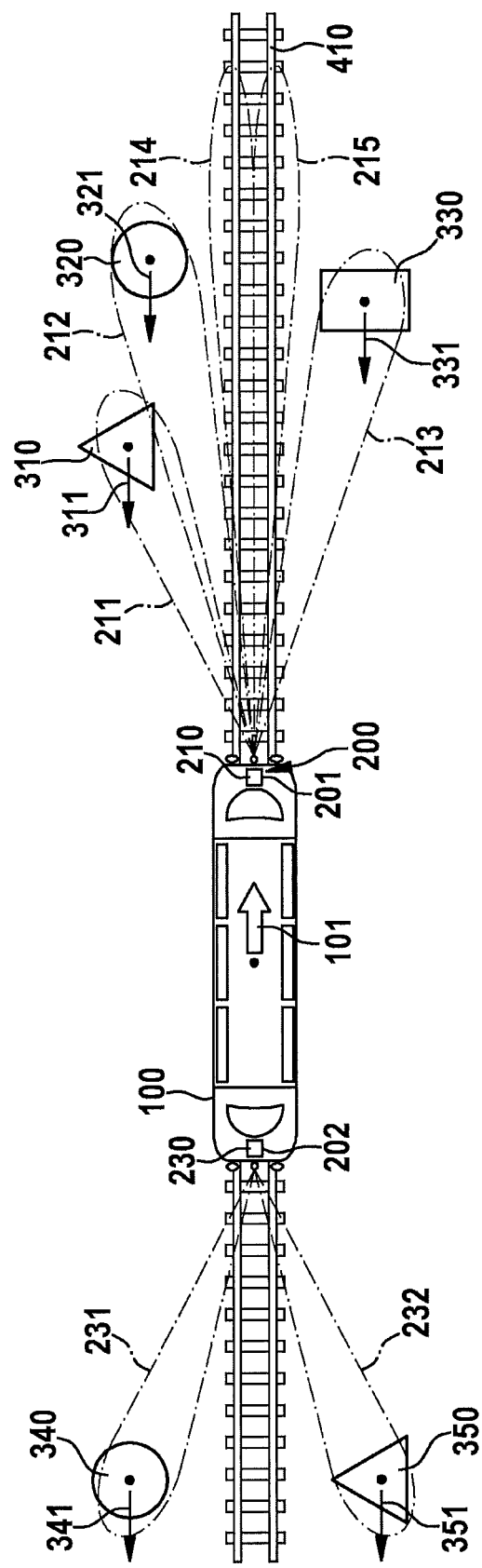
FIG. 3 shows in schematic form, a driving situation in which both the objects situated in front of the vehicle and the objects situated behind the vehicle are detected by sensors in order to determine the absolute speed of the vehicle.

In the case of the vehicles shown in FIGS. 1 and 2 by way of example, only objects that are situated in front of the vehicle are used for measuring the own speed. However, it is also possible to determine the ego-driving speed with the aid of objects that are situated behind the vehicle. In this context, FIG. 3 exemplarily illustrates a rail-bound vehicle 100, which is not only equipped with frontal sensor system 201 but also with a sensor system 202 pointing toward the rear. Rear sensor system 202 situated in the rear region of vehicle 100 includes at least one sensor device 230, pointing toward the rear in the driving direction, for measuring the relative speed of objects that are located behind the vehicle. Two stationary objects 340, 350 behind vehicle 100 are shown by way of example. As indicated by detection cones 231, 232 sketched by dashes, the two rear objects 340, 350 situated along travel route 410 are detected by at least one sensor device 230 of rear sensor system 202. In so doing, relative speed 341, 351 of particular objects 340, 350 is measured and the measuring results are supplied to the control and evaluation unit of measuring device 200 in order to determine the own speed of vehicle 100.

Figure 4:
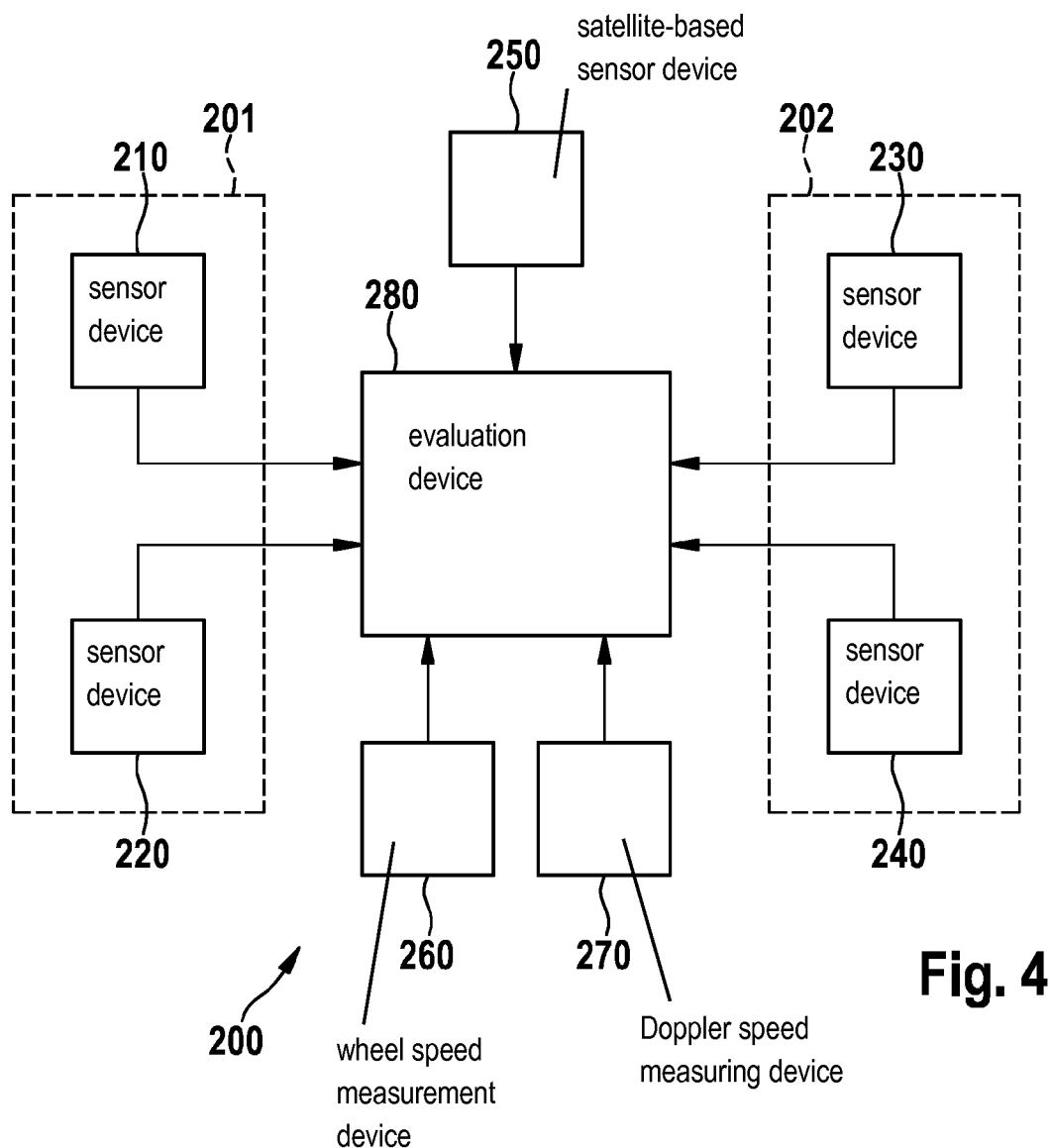
FIG. 4 shows in schematic form, a measuring device according to the present invention for determining the absolute speed of a vehicle on the basis of the relative speed of objects in the vehicle environment.

FIG. 4 shows an example measuring device 200 according to the present invention by way of example. Example measuring device 200 according to the present invention includes a front sensor system 201 having at least one sensor device for detecting objects and for measuring the relative speed of the detected objects. In the case at hand, front sensor system 201 includes a total of two sensor devices 210, 220, such as a video camera and a radar device. Optionally or alternatively to first sensor system 201, measuring device 200 furthermore has a second sensor system which likewise has one or more sensor device(s) 230, 240 for detecting objects behind the vehicle. Sensor devices 210, 220, 230, 240 of the two sensor systems 201, 202 are preferably connected to a shared control and evaluation unit 280, which analyzes the information from the individual sensor devices 210, 220, 230, 240 and uses it to determine the current driving speed of the vehicle. This is, for example, a computing device which performs the analysis of the measuring results by means of suitable algorithms. The measured relative speeds may be compared with a reference value in this analysis. In this context, only the particular relative speeds that deviate from the reference value by no more than a specifiable amount may be used for determining the current driving speed. In addition, based on its relative speed, any object may be assigned an individual probability of being a stationary object. Only the relative speeds of the particular objects that exhibit the highest probability are used when determining the current driving speed. As an alternative, the current driving speed is able to be determined from the average value of a number of measured relative speeds.

In addition, measuring device 200 may include additional measuring or sensor devices, which are used to verify the measuring results or to provide a reference value. FIG. 4, by way of example, shows a satellite-based sensor device 250, a wheel speed measurement device 260, and a Doppler speed measuring device 270 which uses the reflection of radiation at the subsurface.

The present invention provides high availability of the speed signal. The flexible structure of the measuring device allows a simple installation in vehicles. For example, it is possible to accommodate the sensor devices at especially protected installation locations.

Although the present invention has been illustrated and described in detail using the preferred exemplary embodiments, the present invention is not restricted by the disclosed examples. Instead, one skilled in the art will be able to derive other variants from these examples, without departing from the protective scope of the present invention. In particular, in addition to the measuring methods described here explicitly, it is basically also possible to use other suitable measuring methods to measure the relative speed of stationary as well as non-stationary objects. Generally, any useful combination of the various measuring methods is possible as well in this context.

What is claimed is:

1. A method for determining the speed of a vehicle, comprising:
   detecting at least one object located in the environment of the vehicle and measuring a relative speed of the detected object in relation to the vehicle;
   comparing the relative speed of the detected object with a reference speed; and
   using the relative speed of the detected object as the speed of the vehicle only if the relative speed corresponds to the reference speed;
   wherein the speed of the vehicle is determined in recurring manner, with the relative speed that is used as the speed of the vehicle being used as a subsequent reference speed in a subsequent performance of the comparing step.

2. The method as recited in claim 1, further comprising:
   analyzing whether the detected object is a stationary or a moving object; and
   using the relative speed of the detected object to determine the speed of the vehicle only if the detected object has been evaluated as stationary.

3. A method for determining the speed of a vehicle, comprising:
   detecting multiple objects located in the environment of the vehicle and measuring relative speeds of the detected objects in relation to the vehicle;
   comparing the relative speed of at least one of the detected objects with a reference speed; and
   using the relative speed of the at least one of the detected objects as the speed of the vehicle only if the relative speed of the at least one of the detected objects corresponds to the reference speed;
   wherein the speed of the vehicle is determined in recurring manner, with the relative speed of the at least one of the detected objects that is used as the speed of the vehicle being used as a subsequent reference speed in a subsequent performance of the comparing step.

4. The method as recited in claim 3, wherein the relative speeds of multiple objects detected in the environment of the vehicle are measured, and an individual probability of being a stationary object is determined for each of the detected objects, and only particular objects having the highest probability are considered when determining the speed of the vehicle.

5. The method as recited in claim 4, wherein the probability assigned to an object of being a stationary object rises with increasing agreement between the relative speed determined for the object, and the reference speed.

6. The method as recited in claim 3, wherein the speed of the vehicle is determined on the basis of the measured relative speed of objects that are situated at least one of in front of and behind the vehicle, in the driving direction.

7. The method as recited in claim 3, wherein the detection of the objects in the environment of the vehicle takes place with the aid of at least one of an optical, acoustical, and a radar-based, measuring method.

8. The method as recited in claim 3, wherein the measurement of the relative speed of the detected objects takes place with the aid of a measuring method based on the Doppler effect.

9. A device for determining the speed of a vehicle, comprising
   a first sensor device to detect an object in an environment of the vehicle;
   a second sensor device to measure a relative speed of the detected object in relation to the vehicle; and
   an evaluation device to determine the speed of the vehicle on the basis of the measured relative speed of the object, wherein the speed of the vehicle is determined in recurring manner, and wherein the evaluation device compares the relative speed of the detected object with a reference speed, and wherein the evaluation device uses the relative speed of the detected object as the speed of the vehicle only if the relative speed corresponds to the reference speed, and wherein the relative speed that is used as the speed of the vehicle is used as a subsequent reference speed during a subsequent determination of the speed by the evaluation device.

10. A method for determining the speed of a vehicle, comprising:
    detecting at least one object located in the environment of the vehicle and measuring a relative speed of the detected object in relation to the vehicle;
    comparing the relative speed of the detected object with a reference speed; and
    using the relative speed of the detected object as the speed of the vehicle only if the relative speed corresponds to the reference speed;
    repeating the detecting, comparing, and using steps, wherein the relative speed that is used as the speed of the vehicle is used as a subsequent reference speed during a repeating of the detecting, comparing, and using steps.

* * * * *